United States Patent
Zhang et al.

(10) Patent No.: US 11,838,799 B2
(45) Date of Patent: Dec. 5, 2023

(54) REDUNDANT TRANSMISSION DETERMINATION

(71) Applicant: LENOVO (BEIJING) LIMITED, Beijing (CN)

(72) Inventors: Zhuoyun Zhang, Beijing (CN); Lianhai Wu, Beijing (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1 day.

(21) Appl. No.: 17/253,055

(22) PCT Filed: May 22, 2018

(86) PCT No.: PCT/CN2018/087793
§ 371 (c)(1),
(2) Date: Dec. 16, 2020

(87) PCT Pub. No.: WO2019/222905
PCT Pub. Date: Nov. 28, 2019

(65) Prior Publication Data
US 2021/0274385 A1    Sep. 2, 2021

(51) Int. Cl.
*H04W 28/08* (2023.01)
*H04W 28/02* (2009.01)

(52) U.S. Cl.
CPC ... *H04W 28/0942* (2020.05); *H04W 28/0236* (2013.01); *H04W 28/0268* (2013.01); *H04W 28/0284* (2013.01)

(58) Field of Classification Search
CPC ......... H04W 28/0942; H04W 28/0236; H04W 28/0268; H04W 28/0284
See application file for complete search history.

(56) References Cited

U.S. PATENT DOCUMENTS

| | | | |
|---|---|---|---|
| 11,265,755 B2 * | 3/2022 | Han | H04W 76/27 |
| 2007/0041349 A1 | 2/2007 | Kim et al. | |
| 2015/0023363 A1 * | 1/2015 | Hui | H04L 45/14 |
| | | | 370/408 |
| 2015/0327282 A1 | 11/2015 | Werner et al. | |

(Continued)

FOREIGN PATENT DOCUMENTS

| | | |
|---|---|---|
| EP | 3070975 A1 | 9/2016 |
| WO | 2017182927 A1 | 10/2017 |
| WO | 2017215670 A1 | 12/2017 |

OTHER PUBLICATIONS

PCT/CN2018/087793, "International Search Report and the Written Opinion of the International Search Authority" ISA/CN, National Intellectual Property Administration, Office of the PRC China, dated Jan. 10, 2019, pp. 1-6.

*Primary Examiner* — Bailor C Hsu
(74) *Attorney, Agent, or Firm* — Kunzler Bean & Adamson (57) ABSTRACT

Method and apparatus may be used for determining whether or not redundant transmission is enabled. One method for determining whether or not redundant transmission is enable includes: receiving trigger information, wherein the trigger information includes at least one of prediction information, load information, QoS information and reliability indication information; and determining whether or not redundant transmission is enabled according to the received trigger information.

20 Claims, 3 Drawing Sheets

(56) References Cited

U.S. PATENT DOCUMENTS

| | | | | |
|---|---|---|---|---|
| 2018/0270679 | A1* | 9/2018 | Laselva | H04W 36/0088 |
| 2018/0279168 | A1* | 9/2018 | Jheng | H04L 5/001 |
| 2018/0317130 | A1* | 11/2018 | Jin | H04W 24/10 |
| 2018/0332501 | A1* | 11/2018 | Tseng | H04W 76/10 |
| 2018/0367288 | A1* | 12/2018 | Vrzic | H04W 36/0069 |
| 2018/0368107 | A1* | 12/2018 | Babaei | H04L 1/1838 |
| 2019/0239112 | A1* | 8/2019 | Rao | H04W 76/14 |
| 2019/0253915 | A1* | 8/2019 | Joseph | H04W 80/08 |
| 2019/0253917 | A1* | 8/2019 | Dao | H04L 12/1407 |
| 2019/0268815 | A1* | 8/2019 | Zhu | H04W 36/0066 |
| 2020/0084663 | A1* | 3/2020 | Park | H04W 80/02 |
| 2020/0107213 | A1* | 4/2020 | Park | H04L 41/0806 |
| 2020/0112907 | A1* | 4/2020 | Dao | H04M 15/84 |
| 2020/0145876 | A1* | 5/2020 | Dao | H04W 28/06 |
| 2020/0154498 | A1* | 5/2020 | Wang | H04W 92/20 |
| 2020/0187282 | A1* | 6/2020 | Yu | H04L 5/0055 |
| 2020/0313794 | A1* | 10/2020 | Chandramouli | H04W 76/15 |
| 2020/0351701 | A1* | 11/2020 | Godin | H04W 28/0268 |
| 2021/0051739 | A1* | 2/2021 | Kweon | H04W 76/22 |
| 2021/0100061 | A1* | 4/2021 | Park | H04W 28/0268 |
| 2022/0060942 | A1* | 2/2022 | Jeon | H04L 43/0852 |

* cited by examiner

REDUNDANT TRANSMISSION DETERMINATION

FIELD

The subject matter disclosed herein generally relates to wireless communications and, more particularly, to determining redundant transmission.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM). Session Management Function (SMF), Network Slice Selection Function (NSSF), Network Exposure Function (NEF), Network Repository Function (NRF), Policy Control Function (PCF), Unified Data Management (UDM), Application Function (AF), Network Data Analytics Function (NWDAF), Authentication Server Function (AUSF), Access and Mobility Management Function (AMF), User Equipment (UE), Access Network (AN), Radio Access Network (RAN), User Plane Function (UFP), Data Network (DN), Operation Administration and Maintenance (OAM), Packet Data Unit (PDU), Quality of Service (QoS).

In a 5G network (e.g., next generation network), there is a key issue supporting high reliability in a user plane. High reliability may be implemented through redundant transmission. The redundant transmission may be determined for a PDU session or any of the QoS flows contained therein. It is currently unknown of which parameters would be considered on determining whether or not redundant transmission is enabled and which entity is responsible for decision-making.

BRIEF SUMMARY

Method and apparatus for determining whether or not redundant transmission is enabled are disclosed.

In one embodiment, a method comprises: receiving trigger information, wherein the trigger information includes at least one of prediction information, load information, QoS information and reliability indication information; and determining whether or not redundant transmission is enabled according to the received trigger information.

In some embodiment, the prediction information includes reliability prediction information indicating that a user plane apparatus or a user plane link is predicted to be unreliable. In another embodiment, the prediction information includes load prediction information indicating that the load on a user plane apparatus is predicted to be higher than a predetermined threshold. In a further embodiment, the prediction information indicates that a PDU session or a QoS flow is predicted to be unreliable. The load information indicates that the load on a user plane apparatus is higher than a predetermined threshold. The QoS information indicates an updated QoS of a QoS flow. The reliability indication information indicates that the reliability of a service is not satisfied In some embodiment, the method is performed at a session management apparatus. In another embodiment, the method is performed at a policy control apparatus. The method may further comprise transmitting a session management policy indicating the determination to a session management apparatus.

In some embodiment, the prediction information is received from a network data analytics apparatus. The load information is originated from a network repository apparatus, an operation administration and maintenance apparatus or a user plane apparatus. The reliability indication information is originated from an application server. The QoS information is received from a policy control apparatus.

In some embodiment, the redundant transmission is determined for a QoS flow.

In another embodiment, an apparatus comprises a receiver that receives trigger information, wherein the trigger information includes at least one of prediction information, load information, QoS information and reliability indication information; and a processor that determines whether or not redundant transmission is enabled according to the received trigger information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

Figure 1:
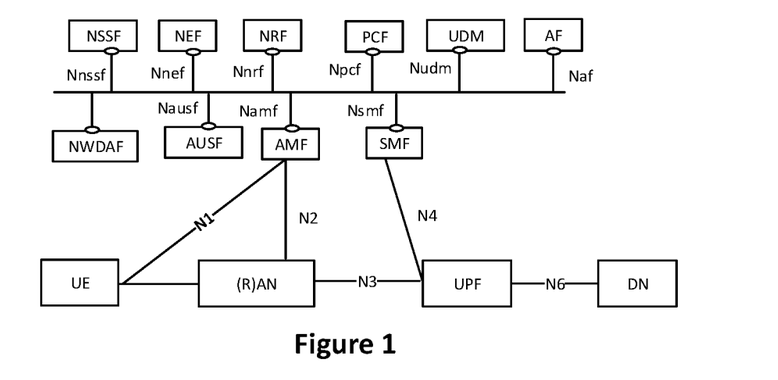
FIG. 1 is a schematic block diagram illustrating a 5G system architecture.

FIG. 1 depicts a 5G system architecture defining various functional entities. FIG. 1 illustrates Network Slice Selection Function (NSSF), Network Exposure Function (NEF), Network Repository Function (NRF), Policy Control Function (PCF), Unified Data Management (UDM), Application Function (AF), Network Data Analytics Function (NWDAF), Authentication Server Function (AUSF), Access and Mobility Management Function (AMF), Session Management Function (SMF) and User Plane Function (UFP). In addition, FIG. 1 illustrates User Equipment (UE), (R)AN (Radio Access Network) and Data Network (DN).

Nnssf is a service-based interface exhibited by NSSF. Nnef is a service-based interface exhibited by NEF. Nnrf is a service-based interface exhibited by NRF. Npcf is a service-based interface exhibited by PCF. Nudm is a service-based interface exhibited by UDM. Naf is a service-based interface exhibited by AF. Nausf is a service-based interface exhibited by AUSF. Namf is a service-based interface exhibited by AMF. Nsmf is a service-based interface exhibited by SMF. N1 is a reference point (interface) between the UE and the AMF. N2 is a reference point (interface) between the (R)AN and the AMF. N3 is a reference point (interface) between the (R)AN and the UPF. N4 a is a reference point (interface) between the SMF and the UPF. N6 a is a reference point (interface) between the UPF and the DN.

Figure 2:
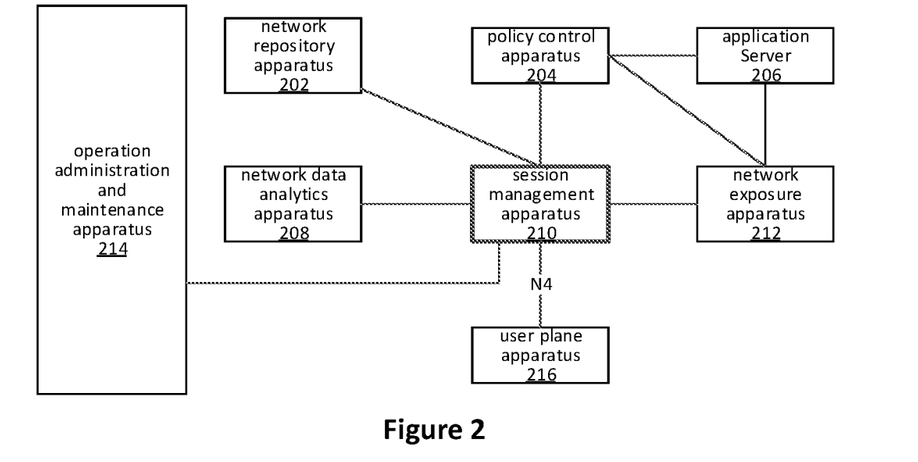
FIG. 2 illustrates a first embodiment of a network structure for determining whether or not redundant transmission is enabled.

FIG. 2 depicts the first embodiment of a network structure of functional entities for determining whether or not redundant transmission is enabled. The functional entities includes: network repository apparatus 202, policy control apparatus 204, application server 206, network data analytics apparatus 208, session management apparatus 210, network exposure apparatus 212, operation administration and maintenance apparatus 214 and user plane apparatus 216. In 5G, the network repository apparatus is implemented as NRF; the policy control apparatus is implemented as PCF; the application server is implemented as AF; the network data analytics apparatus is implemented as NWDAF; the session management apparatus is implemented as SMF; the network exposure apparatus is implemented as NEF; the operation administration and maintenance apparatus is implemented as OAM; and the user plane apparatus is implemented as UPF. The invention is described in a 5G context. However, the invention is not limited in any specific network implementation.

In 5G, a PDU Connectivity Service (i.e., a service that provides exchange of PDUs between a UE and a data network) is supported via PDU sessions that are established upon requests from UEs. In a PDU session, a plurality of QoS flows with different QoS requirements can be included. A QoS Flow ID (QFI) is used to identify a QoS flow. User Plane traffic with the same QFI within a PDU Session receives the same traffic forwarding treatment (e.g., scheduling, admission threshold).

In the first embodiment, the session management apparatus makes the decision on whether or not redundant transmission is enabled. The redundant transmission may be enabled for a QoS flow. If the redundant transmission is enabled for all of QoS flows included in a PDU session, it can be considered that the redundant transmission is enabled for the PDU session.

If the redundant transmission is enabled, one or more redundant nodes (e.g., user plane apparatus(es)) may be added, and/or one or more links between user plane apparatuses may be added.

The session management apparatus makes the decision according to trigger information received from other functional entities depicted in FIG. 2. The trigger information may be any of prediction information, load information, QoS information and reliability indication information (detailed below).

In principle, the network data analytics apparatus is able to make use of any data within a core network. The network data analytics apparatus may provide prediction information regarding user plane apparatuses and/or QoS flows to the session management apparatus. The prediction information may include reliability prediction information and/or load prediction information. The reliability prediction information indicates that a user plane apparatus and/or a user plane link (between user plane apparatuses) are/is predicted to be unreliable at a certain point in time. The load prediction information indicates that a load on a certain user plane apparatus is predicted to be higher than a predetermined threshold.

In one embodiment, the session management apparatus may request the network data analytics apparatus to transmit the prediction information. In other embodiments, if the network data analytics apparatus is subscribed by the session management apparatus, the network data analytics apparatus may notify the session management apparatus once the prediction information is generated. The prediction information is generated in the condition that a user plane apparatus or a user plane link is predicted to be unreliable, or in the condition that a load on a certain user plane apparatus is predicted to be higher than the predetermined threshold.

In some embodiment, the network data analytics apparatus may not know the address of the session management apparatus. In this condition, the network data analytics apparatus may interact with a unified data management apparatus (implemented as UDM in 5G) to obtain the address or identity of the session management apparatus.

Upon receiving the prediction information, the session management apparatus determines whether or not redundant transmission is enabled for a QoS flow or a PDU session. The QoS requirement of QoS flows may not be satisfied according to the prediction information. For example, in the condition that a user plane apparatus becomes unreliable, preventing the QoS requirement of a QoS flow from being satisfied, the redundant transmission is enabled for the QoS flow. For another example, in the condition that a user plane link between user plane apparatuses becomes unreliable, preventing the QoS requirement of a QOS flow from being satisfied, the redundant transmission is enabled for the QOS flow. If the redundant transmission needs to be enabled for all the QOS flows within the PDU session of the UE, the redundant transmission is enabled for the PDU session. In short, the session management apparatus decides whether redundant transmission is enabled for a QoS flow or a PDU session, according to the received prediction information.

The load information indicates the actual load on the user plane apparatus. In particular, the load information indicates that a load on the user plane apparatus is higher than a predetermined threshold. In one embodiment, the load information may be transmitted from the user plane apparatus to the session management apparatus. In other embodiment, the load information may be provided to the session management apparatus from the network repository apparatus or the operation administration and maintenance apparatus if the load information is also known by the network repository apparatus and the operation administration and maintenance apparatus. In one embodiment, the session management apparatus may request the user plane apparatus or the network repository apparatus or the operation administration and maintenance apparatus to transmit the load information. In another embodiment, in the condition that the load on the user plane apparatus is higher than the predetermined threshold, the user plane apparatus or the network repository apparatus or the operation administration and maintenance apparatus may transmit the load information to the session management apparatus.

When the load on a user plane apparatus is higher than the predetermined threshold, the QoS requirement of any of QoS flows may not be satisfied. Therefore, the session management apparatus determines that redundant transmission is enabled for the QoS flow or the PDU session which results in the QoS requirement being not satisfied.

The policy control apparatus may update the QoS of a QOS flow, so that a higher reliability is required at the user plane apparatus. The updated QoS is transmitted as QoS information to the session management apparatus.

Upon receiving the QoS information, the session management apparatus determines whether or not redundant transmission is enabled for a QoS flow or a PDU session. The updated QoS of the QoS flow may not be satisfied by the user plane apparatus. In this condition, the session management apparatus may decide that redundant transmission is enabled for the QoS flow or the PDU session, the QoS requirement of which is not satisfied. For example, the session management apparatus may decide that one or more redundant session management apparatuses or one or more redundant links would be added.

The application server may generate reliability indication information in the condition that the reliability requirement of a service of a UE is not satisfied. The traffic of the service may be transmitted via a QoS flow, or in other cases, via a PDU session including multiple QoS flows, or via multiple PDU sessions. In the condition that the reliability requirement of the service is not satisfied, the redundant transmission shall be enabled for the QoS flows and/or PDU sessions via which the service is transmitted.

A UE identity and a service identifier may be included in the reliability indication information. The UE identity indicates the identity of a UE that uses the service. The service identifier indicates an identifier of the service. If multiple UEs use the service, the application server may generate reliability indication information for each of the multiple UEs. Alternatively, if the multiple UEs belong to a UE group to which a UE group identity is assigned, the reliability indication information may include the UE group identity and the service identifier.

There are various routes that may be used to transmit the reliability indication information to the session management apparatus. For example, the application server may provide the reliability indication information to the network exposure apparatus, and then the network exposure apparatus would send the reliability indication information to the session management apparatus. Alternatively, the application server may provide the reliability indication information to the network exposure apparatus, and then the network exposure apparatus would send the reliability indication information to the policy control apparatus, and subsequently the policy control apparatus will send the reliability indication information to the session management apparatus. Another alternative, the application server may provide the reliability indication information to the policy control apparatus, and the policy control apparatus would send the reliability indication information to the session management apparatus.

In some embodiments, the network exposure apparatus may not know the address of the session management apparatus and/or the policy control apparatus. Under this condition, the network exposure apparatus may interact with a unified data management apparatus (implemented as UDM in 5G) to obtain the address or identity of the session management apparatus and/or the policy control apparatus.

Upon receiving the reliability indication information, the session management apparatus decides whether or not redundant transmission is enabled for QoS flows and/or PDU sessions. The UE Identity or the UE group identity and the service identifier may be used by the session management apparatus to decide to which PDU sessions and/or which QoS flows of the UEs the redundant transmission would be added.

As described above, the prediction information, the load information, the QoS information and the reliability indication information may be received at the session management apparatus. The session management apparatus may decide whether or not redundant transmission is enabled according to the prediction information, the load information, the QoS information and the reliability indication information. The redundant transmission may be determined for a PDU session or a QoS flow.

In the condition that the redundant transmission is enabled, one or more redundant user plane apparatuses may be added and/or one or more redundant links may be added to the user plane of the PDU sessions for the UE.

Figure 3:
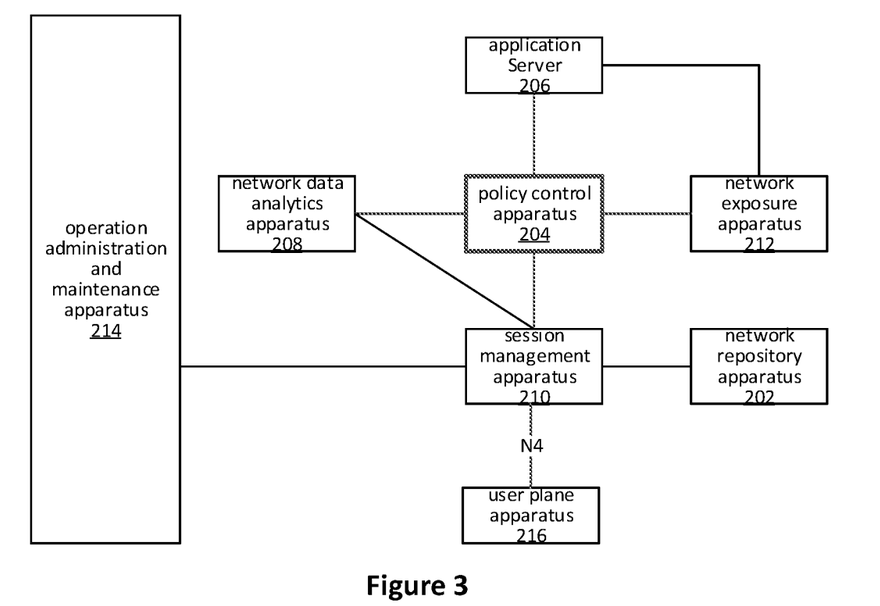
FIG. 3 illustrates a second embodiment of a network structure for determining whether or not redundant transmission is enabled.

FIG. 3 illustrates the second embodiment of a network structure of functional entities for determining whether or not redundant transmission is enabled. The functional entities shown in FIG. 3 are substantially the same as those shown in FIG. 2.

In the second embodiment, the policy control apparatus makes the decision on whether or not redundant transmission is enabled. After the decision is made, the policy control apparatus modifies the session management policy towards the session management apparatus. The redundant transmission indication, which indicates whether or not redundant transmission is added for a PDU session or a QoS flow, is contained in the session management policy. In the condition that the redundant transmission is added for specific QoS flows, the indication of the specific QoS flows in need of the redundant transmission may be included in the redundant transmission indication.

The session management apparatus updates the user plane according to the session management policy received from the policy control apparatus.

In the second embodiment, the policy control apparatus decides whether or not the redundant transmission is added for a certain PDU session or a certain QoS flow according to any of the following information: the prediction information, the load information, the QoS information and the reliability indication information, similar to the first embodiment.

The network data analytics apparatus may provide prediction information on PDU sessions and/or QoS flows to the policy control apparatus. The prediction information may indicate that a PDU session and/or a QoS flow are predicted to be unreliable, which means that the QoS requirement of the PDU session and/or the QoS flow are predicted to be not satisfied.

In one embodiment, the policy control apparatus may request the network data analytics apparatus to transmit the prediction information. In other embodiments, if the network data analytics apparatus is subscribed by the policy control apparatus, the network data analytics apparatus may notify the policy control apparatus once the prediction information is generated. The prediction information is generated in the condition that a PDU session and/or a QoS flow are predicted to be unreliable.

Upon receiving the prediction information, the policy control apparatus determines whether or not redundant transmission is enabled for a QoS flow or a PDU session for the UEs.

Alternatively or additionally, the network data analytics apparatus may provide prediction information including reliability prediction information and/or load prediction information to the session management apparatus. The reliability prediction information indicates that a user plane apparatus or a user plane link is predicted to be unreliable at a certain point in time. The load prediction information indicates that a load on a certain user plane apparatus is predicted to be higher than a predetermined threshold.

In one embodiment, the session management apparatus may request the network data analytics apparatus to transmit the prediction information including reliability prediction information and/or load prediction information. In other embodiments, if the network data analytics apparatus is subscribed by the session management apparatus, the network data analytics apparatus may notify the session management apparatus once the prediction information is generated. The prediction information is generated in the condition that a user plane apparatus or a user plane link is predicted to be unreliable, or in the condition that a load on a certain user plane apparatus is predicted to be higher than the predetermined threshold. Upon receiving the prediction information, the session management apparatus may request the policy control apparatus to update the session management policy. The request may be implemented by transmitting the prediction information to the policy control apparatus.

The load information is transmitted to the session management apparatus in the condition that the load on the user plane apparatus is higher than a predetermined threshold. The load information may be transmitted from the user plane apparatus or the network repository apparatus or the operation administration and maintenance apparatus to the session management apparatus. The session management apparatus may be notified in the condition that a load on a certain user plane apparatus is higher than a predetermined threshold. Upon receiving the load information, the session management apparatus may request the policy control apparatus to update the session management policy for a certain PDU session or a certain QoS flow. The request may be implemented by transmitting the load information to the policy control apparatus.

The policy control apparatus may update the QoS requirement of a QOS flow, so that a higher reliability is required at the user plane apparatus. The updated QoS, which is referred to as QoS information, is used by the policy control apparatus to make the decision on whether or not redundant transmission is enabled.

The application server generates reliability indication information in the condition that the reliability requirement of a service is not satisfied for UEs. A UE identity or a group IE identity and a service identifier may be included in the reliability indication information.

There are various routes that may be used to transmit the reliability indication information to the policy control apparatus. For example, the application server may provide the reliability indication information to the network exposure apparatus, and then the network exposure apparatus would send the reliability indication information to the policy control apparatus. Alternatively, the application server may provide the reliability indication information to the policy control apparatus.

Upon receiving the reliability indication information, the policy control apparatus decides whether or not redundant transmission is enabled for QoS flows and/or PDU sessions. The UE Identity or the UE group identity and the service identifier may be used by the policy control apparatus to decide the redundant transmission would be added to which PDU sessions and/or which QoS flows of the UE.

In some embodiments, the network exposure apparatus may not know the address of the policy control apparatus. In this condition, the network exposure apparatus may interact with a unified data management apparatus (implemented as UDM in 5G) to obtain the address or identity of the policy control apparatus.

Figure 4:
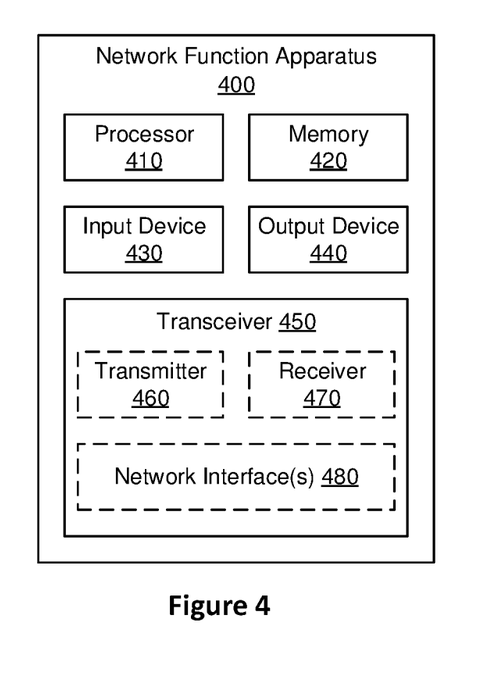
FIG. 4 is a schematic block diagram of a network function apparatus used for determining whether or not redundant transmission is enabled.

FIG. 4 depicts one embodiment of a network function apparatus 400 that may be used for determining whether or not redundant transmission is enabled, according to embodiments of the disclosure. The network function apparatus 400 may be one embodiment of the session management apparatus or the policy control apparatus described above. The other functional entities may also be implemented by the network function apparatus 400.

The network function apparatus 400 may include a processor 410, a memory 420, an input device 430, an output device 440, a transceiver 450 for communicating with other functional entities. As depicted, the transceiver 450 may include a transmitter 460 and a receiver 470. The transceiver 450 may also support one or more network interface 480, such as the N4 interface and similar interfaces used to communicate among functional entities.

In some embodiments, the input device 430 and the output device 440 are combined into a single device, such as a touch screen. In certain embodiments, the network function apparatus 400 may not include any input device 430 and/or output device 440.

The processor 410, in one embodiment, may include any known controller capable of executing computer-readable instructions and/or capable of performing logical operations. For example, the processor 410 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 410 executes instructions stored in the memory 420 to perform the methods and routines described herein. The processor 410 is communicatively coupled to the memory 420, the input device 430, the output device 440, and the transceiver 450.

In some embodiments, the receiver 470 receives trigger information, wherein the trigger information includes at least one of prediction information, load information, QoS information and reliability indication information.

In certain embodiments, the processor 410 determines whether or not redundant transmission is enabled according to the received trigger information.

The memory 420, in one embodiment, is a computer readable storage medium. In some embodiments, the memory 420 includes volatile computer storage media. For example, the memory 420 may include a RAM, including dynamic RAM (DRAM), synchronous dynamic RAM (SDRAM), and/or static RAM (SRAM). In some embodiments, the memory 420 includes non-volatile computer storage media. For example, the memory 420 may include a hard disk drive, a flash memory, or any other suitable non-volatile computer storage device. In some embodiments, the memory 420 includes both volatile and non-volatile computer storage media.

The input device 430, in one embodiment, may include any known computer input device including a touch panel, a button, a keyboard, a stylus, a microphone, or the like. In some embodiments, the input device 430 may be integrated with the output device 440, for example, as a touch screen or similar touch-sensitive display. In some embodiments, the input device 430 includes two or more different devices, such as a keyboard and a touch panel. In certain embodiments, the input device 430 may include a camera for capturing images or otherwise inputting visual data.

The output device 440, in one embodiment, may include any known electronically controllable display or display device. The output device 440 may be designed to output visual, audible, and/or haptic signals. In some embodiments, the output device 440 includes an electronic display capable of outputting visual data to a user. For example, the output device 440 may include, but is not limited to, an LCD display, an LFD display, an OLED display, a projector, or similar display device capable of outputting images, text, or the like to a user.

In certain embodiments, the output device 440 includes one or more speakers for producing sound. For example, the output device 440 may produce an audible alert or notification (e.g., a beep or chime). In some embodiments, the output device 440 includes one or more haptic devices for producing vibrations, motion, or other haptic feedback. In some embodiments, all or portions of the output device 440 may be integrated with the input device 430. For example, the input device 430 and output device 440 may form a touch screen or similar touch-sensitive display. In other embodiments, the output device 440 may be located near the input device 430.

The transceiver 450 communicates with functional entities within a mobile communication network. The transceiver 450 may include one or more transmitters 460 and one or more receivers 470. As discussed above, the transceiver 450 may supports one or more the network interface 480 for communicating with.

Figure 5:
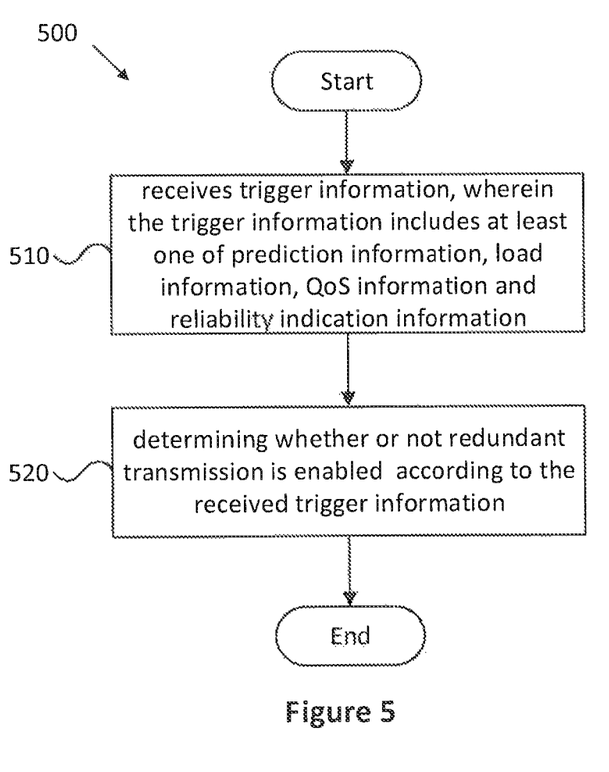
FIG. 5 illustrates one embodiment of a method for determining whether or not redundant transmission is enabled.

FIG. 5 is a schematic flow chart diagram illustrating one embodiment of a method 500 for determining whether or not redundant transmission is enabled, according to embodiments of the disclosure. In some embodiments, the method 500 is performed by a functional entity, such as the session management apparatus or the policy control apparatus, as described above. In certain embodiments, the method 500 may be performed by a processor executing program code, for example, a microcontroller, a microprocessor, a CPU, a GPU, an auxiliary processing unit, a FPGA, or the like.

The method 500 begins and receives 510 trigger information, wherein the trigger information includes at least one of prediction information, load information, QoS information and reliability indication information.

The method also includes determining 520 whether or not redundant transmission is enabled according to the received trigger information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network apparatus comprising a session management function, a policy control function, or a combination thereof, the method comprising:
   receiving, at the network apparatus, at least one trigger information message from at least one functional entity, wherein the trigger information comprises prediction information;
   determining, at the network apparatus, whether redundant transmission is enabled for a quality of service flow, a protocol data unit session, or a combination thereof according to the received trigger information message; and
   in response to determining that redundant transmission is enabled, initiating at the network apparatus, addition of at least one redundant communication link between the network apparatus and a user plane apparatus of a protocol data unit (PDU) session for a user equipment (UE) so that there are at least two communication links between the network apparatus and the user plane apparatus, wherein the UE is a different device than the network apparatus.

2. The method of claim 1, wherein the prediction information includes reliability prediction information from the user plane apparatus indicating that a user plane apparatus link or a user plane link is predicted to be unreliable.

3. The method of claim 1, wherein the prediction information includes load prediction information indicating that the load on a user plane apparatus is predicted to be higher than a predetermined threshold.

4. The method of claim 1, wherein the prediction information indicates that a protocol data unit session or a quality of service flow is predicted to be unreliable.

5. The method of claim 1, wherein the trigger information further comprises load information indicating that the load on a user plane apparatus is higher than a predetermined threshold.

6. The method of claim 1, wherein the trigger information further comprises quality of service information indicating an updated quality of service of a quality of service flow.

7. The method of claim 1, wherein the trigger information further comprises reliability indication information indicating that the reliability of a service is not satisfied.

8. The method of claim 1, wherein the method is performed at a session management apparatus.

9. The method of claim 8, wherein the prediction information is received from a network data analytics apparatus.

10. The method of claim 8, wherein the trigger information further comprises load information originating from a network repository apparatus, an operation administration and maintenance apparatus or a user plane apparatus.

11. The method of claim 8, wherein the trigger information further comprises reliability indication information originating from an application server.

12. The method of claim 8, wherein the trigger information further comprises quality of service information received from a policy control apparatus.

13. The method of claim 1, wherein the method is performed at a policy control apparatus.

14. The method of claim 13, further comprising: transmitting a session management policy indicating the determination to a session management apparatus.

15. The method of claim 1, wherein the redundant transmission is determined for a quality of service flow.

16. An apparatus comprising a network apparatus, the apparatus further comprising:
    a session management function, a policy control function, or a combination thereof;
    a receiver that receives at least one trigger information message from at least one functional entity, wherein the trigger information comprises prediction information; and
    a processor that:
        determines whether redundant transmission is enabled for a quality of service flow, a protocol data unit session, or a combination thereof according to the received trigger information message; and
        in response to determining that redundant communication link between the network apparatus and a user plane apparatus of a protocol data unit (PDU) session for a user equipment (UE) so that there are at least two communication links between the network apparatus and the user plane apparatus, wherein the UE is a different device than the network apparatus.

17. The apparatus of claim 16, wherein the prediction information includes reliability prediction information from the user plane apparatus indicating that a user plane apparatus link or a user plane link is predicted to be unreliable.

18. The apparatus of claim 16, wherein the prediction information includes load prediction information indicating that the load on a user plane apparatus is predicted to be higher than a predetermined threshold.

19. The apparatus of claim 16, wherein the prediction information indicates that a protocol data unit session or a quality of service flow is predicted to be unreliable.

20. The apparatus of claim 16, wherein the trigger information further comprises load information indicating that the load on a user plane apparatus is higher than a predetermined threshold.

* * * * *